(12) United States Patent
Pipe-Mazo et al.

(10) Patent No.: US 9,832,833 B1
(45) Date of Patent: Nov. 28, 2017

(54) SMART LIGHTING BY OUTDOOR WALL-MOUNTED OR CEILING MOUNTED LIGHT FIXTURES AND/OR CONNECTED LIGHT BULBS

(71) Applicant: Kuna Systems Corporation, Burlingame, CA (US)

(72) Inventors: Daniel Pipe-Mazo, Cupertino, CA (US); Haomiao Huang, Redwood City, CA (US); Christopher Hiszpanski, San Francisco, CA (US); Nnoduka Eruchalu, San Jose, CA (US); Sai-Wai Fu, Los Altos, CA (US); Harold G. Sampson, Sunnyvale, CA (US)

(73) Assignee: KUNA SYSTEMS CORPORATION, San Bruno, CA (US)

( * ) Notice: Subject to any disclaimer, the term of this patent is extended or adjusted under 35 U.S.C. 154(b) by 0 days.

(21) Appl. No.: 15/157,632

(22) Filed: May 18, 2016

Related U.S. Application Data

(60) Provisional application No. 62/166,968, filed on May 27, 2015.

(51) Int. Cl.
| | | |
|---|---|---|
| *H05B 33/08* | (2006.01) | |
| *H05B 37/02* | (2006.01) | |
| *H04W 4/02* | (2009.01) | |
| *F21S 8/04* | (2006.01) | |
| *F21S 8/00* | (2006.01) | |

(Continued)

(52) U.S. Cl.
CPC .......... *H05B 33/0854* (2013.01); *F21S 8/033* (2013.01); *F21S 8/04* (2013.01); *H04W 4/02* (2013.01); *H05B 37/0227* (2013.01); *H05B 37/0272* (2013.01); *H05B 37/0281* (2013.01); *F21W 2131/107* (2013.01); *F21Y 2101/02* (2013.01)

(58) Field of Classification Search
CPC .... H05B 33/08; H05B 33/0845; H05B 37/02; H05B 37/0245; H05B 37/0227; H05B 37/0272; H05B 37/0281; F21S 8/033; F21S 8/04; H04W 4/02
See application file for complete search history.

(56) References Cited

U.S. PATENT DOCUMENTS

| | | | | |
|---|---|---|---|---|
| 2009/0059603 A1* | 3/2009 | Recker | ............... | H05B 37/0272 362/362 |
| 2010/0295454 A1* | 11/2010 | Reed | ................. | H05B 37/0218 315/152 |
| 2014/0028198 A1* | 1/2014 | Reed | ................. | H05B 33/0854 315/152 |

* cited by examiner

*Primary Examiner* — Thai Pham
(74) *Attorney, Agent, or Firm* — Christopher P. Maiorana, PC

(57) ABSTRACT

An apparatus comprising a communication circuit and a processing circuit. The communication circuit may be configured to connect to a network based on a communications protocol. The processing circuit may be configured to control a light based on a pre-defined condition. The processing circuit may determine a location of the apparatus based on an identifier. The processing circuit may synchronize to a universal clock via the network. The processing circuit may determine a local time based on (a) the universal clock and (b) the location, both received from a device connected to the apparatus through the network. The processing circuit may receive input from the device. The processing circuit may calculate the pre-defined condition based on (a) the local time and (b) the input from the device. The processing circuit may determine whether the pre-defined condition has been met.

20 Claims, 11 Drawing Sheets

(51) Int. Cl.
*F21Y 101/02* (2006.01)
*F21W 131/107* (2006.01)

SMART LIGHTING BY OUTDOOR WALL-MOUNTED OR CEILING MOUNTED LIGHT FIXTURES AND/OR CONNECTED LIGHT BULBS

This application relates to U.S. Provisional Application No. 62/166,968, filed May 27, 2015. This application also relates to U.S. application Ser. No. 14/164,540, filed Sep. 21, 2015. Each of the mentioned applications are hereby incorporated by reference in its entirety.

FIELD OF THE INVENTION

The present invention relates to smart lighting generally and, more particularly, to a method and/or architecture for smart lighting by outdoor wall-mounted or ceiling mounted light fixtures and/or connected light bulbs.

BACKGROUND OF THE INVENTION

One conventional detector for controlling light is a dusk to dawn detector. Such a detector uses a photo-diode and suffers from frequent false detection. Another problem with conventional detectors is that the detector cannot provide synchronous timing to multiple light fixtures such as a pair of light fixtures at a front door or at a garage door. A camera as a light sensor is more accurate than a photo-diode, but still not sufficient.

Conventional approaches for controlling lights are limited to pre-set times such as turning the lights on from dusk until a fixed delay time has passed (i.e., 3 hours, 5 hours, etc.). Such approaches are not popular due to various disadvantages. One disadvantage is that fixed timers for controlling lights do not behave the same as when a person controls the lights.

Current technology can control outdoor lights by sensing dusk/dawn, but merely detecting dusk/dawn wastes energy and does not behave in a manner that suggests a person is home. One improvement is to provide pre-set times such as activating the lights from dusk until a fixed delay timer has passed in order to simulate "dusk to bedtime" (i.e., people often turn lights off before going to bed in order to save energy). The "dusk to bedtime" improvement is not popular because users need to manually adjust the fixed delay due to the time of dusk changing throughout the year (i.e., seasonal effects).

When a pair of adjacent lights are controlled using current technology such as photo-diodes, the lights may not turn on and off synchronously. The offset in timing can be bad aesthetically and provides an indication to a potential thief a lighting system is controlled by a photo-diode.

Current motion detection technology can be used to turn on the lights when a person is detected and is effective for both security and energy saving. Motion detection can be used in conjunction with the "dusk to bedtime" feature as described above. However, the motion detection signal cannot be used to turn on indoor lights, limiting the security effectiveness. An alert person inside the house would turn on the indoor lights if someone is detected at the perimeter of the house.

It would be desirable to implement smart lighting by outdoor wall-mounted and/or ceiling mounted light fixtures and connected light bulbs that implement an automatic control to turn on the light from dusk until a pre-defined bedtime.

SUMMARY OF THE INVENTION

The invention concerns an apparatus comprising a communication circuit and a processing circuit. The communication circuit may be configured to connect to a network based on a communications protocol. The processing circuit may be configured to control a light based on a pre-defined condition. The processing circuit may determine a location of the apparatus based on an identifier. The processing circuit may synchronize to a universal clock via the network. The processing circuit may determine a local time based on (a) the universal clock and (b) the location, both received from a device connected to the apparatus through the network. The processing circuit may receive input from the device. The processing circuit may calculate the pre-defined condition based on (a) the local time and (b) the input from the device. The processing circuit may determine whether the pre-defined condition has been met.

BRIEF DESCRIPTION OF THE DRAWINGS

Embodiments of the invention will be apparent from the following detailed description and the appended claims and drawings in which:

DETAILED DESCRIPTION OF THE PREFERRED EMBODIMENTS

Embodiments of the present invention include providing smart lighting by outdoor wall-mounted or ceiling mounted light fixtures and/or connected light bulbs that may (i) provide security features, (ii) provide energy savings, (iii) obtain location information from an external source (e.g., IP address lookup, coordinates from cell phone GPS beacon, etc.), (iv) obtain time zone/UTC offset information from an external source (e.g., IP address lookup, proprietary database query, etc.), (v) use an UTC offset obtained to determine the current date and time, (vi) use location and current date obtained to calculate exact sunrise and sunset times, (vii) use wireless communication between both indoor and outdoor light fixtures, (viii) implement an easy-to-use, calendar driven, control signal using a web database, (ix) detect a Bluetooth MAC addresses of a device to determine if a person carrying the device is a stranger and/or (x) be easy to implement.

The disadvantages of common implementations of home automation for effective security and/or energy savings may be significant. To prevent burglaries, one strategy may be to control an activation/deactivation (e.g., On and Off control)

of both outdoor and indoor lights to provide behavior similar to a person that is home and alert. To save energy, one practice may be to turn off both outdoor and indoor lights close to bedtime.

A smart light may be configured to adapt to user behavior. For example, the smart light may determine random bedtimes around a fixed time. In another example, the smart light may allow for user schedule customization such as providing options for weekdays versus weekends and/or custom schedules for each day based on day, month and/or year.

Figure 1:
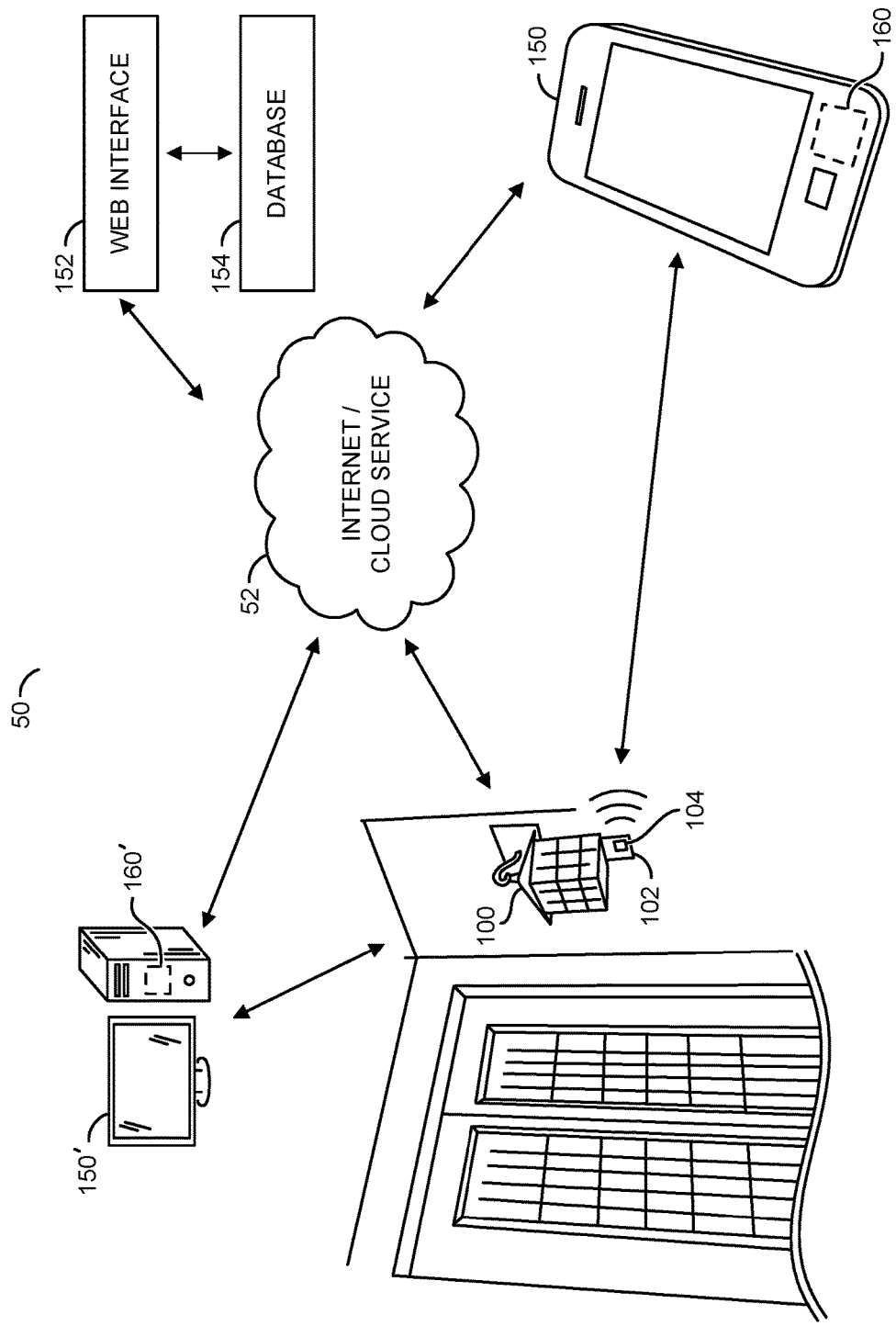
FIG. 1 is a diagram illustrating an embodiment of the invention.

Referring to FIG. 1, a system 50 is shown in accordance with a preferred embodiment of the present invention. The system 50 is shown comprising an apparatus 100. The apparatus 100 may be the smart light. The apparatus 100 is shown as a wall-mounted light fixture. The implementation of the apparatus 100 may be varied according to the design criteria of a particular implementation. For example, the apparatus 100 may be implemented as a ceiling-mounted light fixture and/or a wirelessly connected light bulb.

The apparatus 100 is shown comprising a block (or circuit) 102 and/or a block (or circuit) 104. The circuit 102 may be implemented as a processor. The circuit 104 may be implemented as a communications module.

The system 50 is further shown comprising a block (or circuit) 52, a block (or circuit) 150, a block (or circuit) 150', a block (or circuit) 152 and a block (or circuit) 154. The circuit 52 may implement an internet/cloud service. The circuit 150 may implement a mobile device. The circuit 150' may implement a hard-wired device (e.g., a desktop computer, a laptop computer, a netbook computing device, a tablet computing device, etc.). The circuit 152 may implement a web interface. The circuit 154 may implement a database (e.g., a third-party storage/computing service).

The apparatus 100 may connect to the internet 52 based on a communications protocol (e.g., using a Wi-Fi connection). The apparatus may connect to devices (e.g., the mobile device 150 and/or the desktop computer 150') directly using a communications protocol. The apparatus may connect to the devices (e.g., the mobile device 150 and/or the desktop computer 150') indirectly (e.g., through the internet 52) using a communications protocol. The number and/or type of connections by the apparatus 100 may be varied according to the design criteria of a particular implementation.

The mobile device 150 is shown comprising a block (or circuit) 160. The hard-wired device 150' is shown comprising a block (or circuit) 160'. The circuit 160 and/or the circuit 160' may be implemented as a processor. The processor 160 may allow the apparatus 100 to off-load a portion of the processing from the processor 102 to the mobile device 150. The processor 160' may allow the apparatus 100 to off-load a portion of the processing from the processor 102 to the hard-wired device 150'. For example, the smart and/or powerful features may be provided by the application on the mobile device 150 (or hard-wired device 150') and/or the database 154 (e.g., a third-party server). In some embodiments, some functionality of the apparatus 100 may be performed by the processor 102 and some functionality may be performed by the processor 160 (or the processor 160'). The amount of processing performed by the processor 102, the processor 160 and/or the processor 160' may be varied according to the design criteria of a particular implementation.

Figure 2:
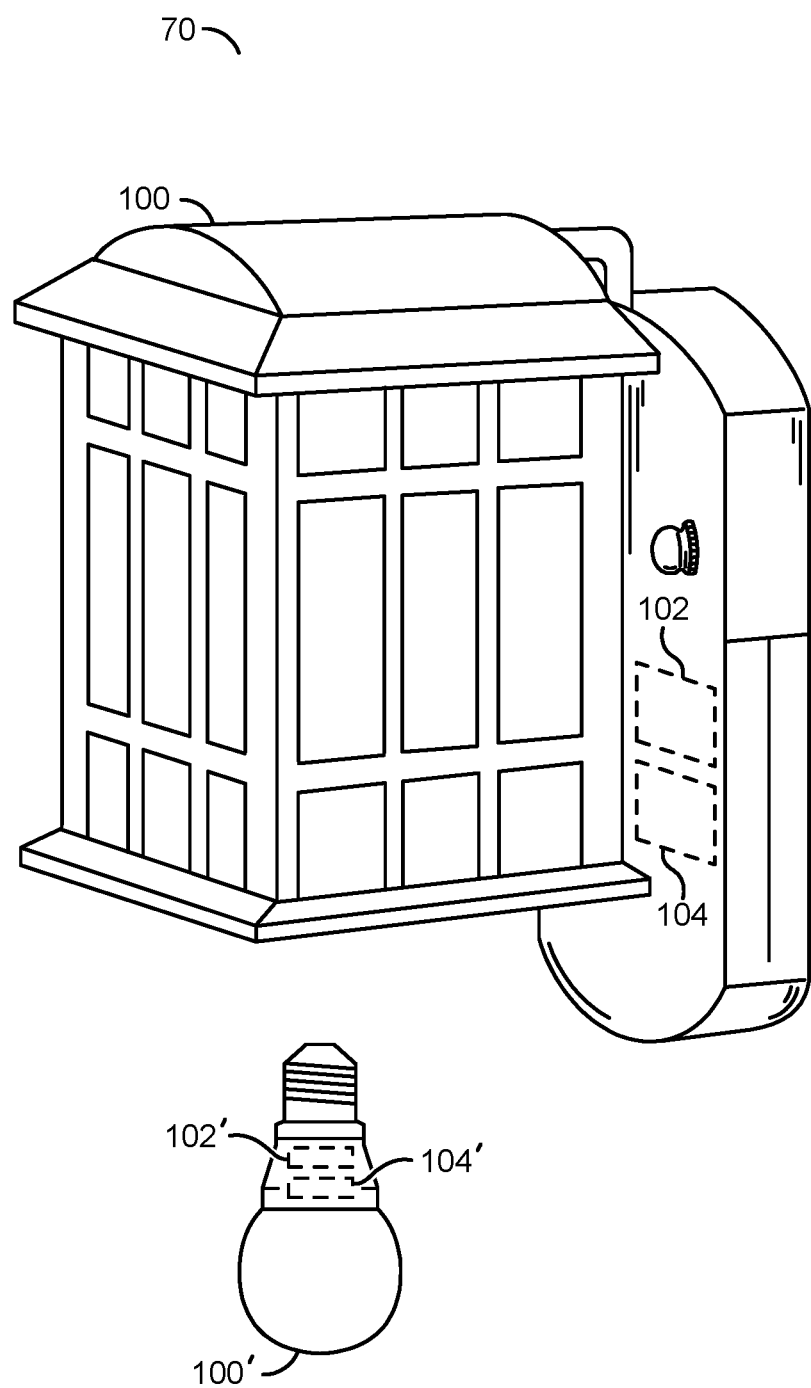
FIG. 2 is a diagram illustrating alternate embodiments of the invention.

Referring to FIG. 2, a diagram 70 illustrating alternate embodiments of the apparatus 100 is shown. In some embodiments, the apparatus 100 may be implemented as a connected light fixture. The connected light fixture 100 is shown having the processor 102 and the communications module 104. In some embodiments, the apparatus 100 may be implemented as a connected light bulb (e.g., shown as the light bulb 100'). The light bulb 100' is shown having the processor 102' and the communications module 104'.

Figure 3:
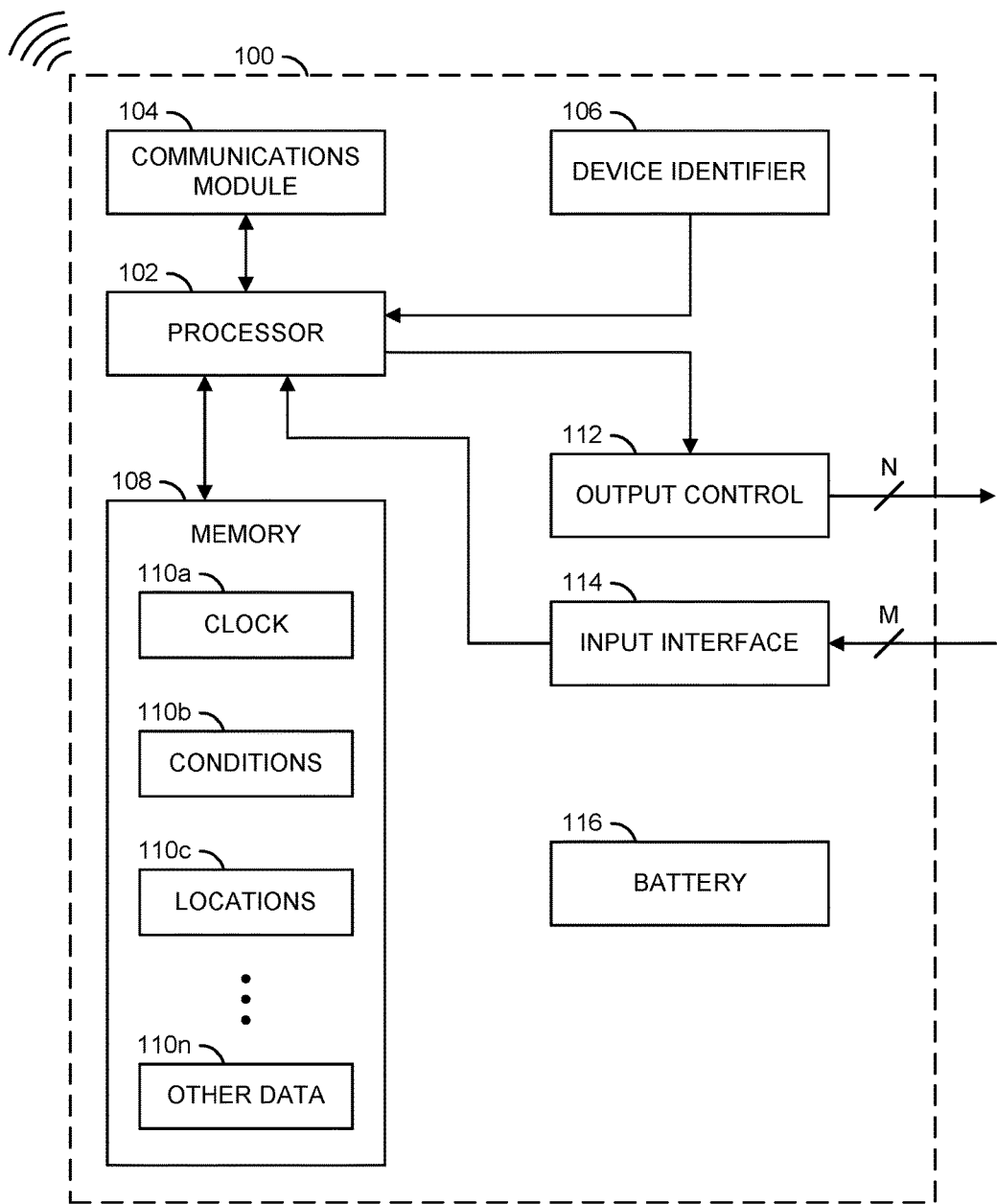
FIG. 3 is a block diagram illustrating an embodiment of the invention.

Referring to FIG. 3, a block diagram illustrating an embodiment of the apparatus 100 is shown. The apparatus 100 is shown comprising the processor 102, the communications module 104, a block (or circuit) 106, a block (or circuit) 108, blocks (or circuits) 110a-110n, a block (or circuit) 112, a block (or circuit) 114 and/or a block (or circuit) 116. The circuit 106 may be a device identifier (e.g., a MAC address, an IP address, an input from a user such as a password, etc.). The circuit 108 may be a memory (e.g., a non-volatile memory). The circuit 110a may store clock data. The circuit 110b may store conditions data (e.g., pre-defined conditions). In an example, the pre-defined conditions may comprise calendar information and/or schedules (e.g., weekend schedules and/or weekday schedules). The circuit 110c may store locations (e.g., location data). The circuit 110n may store other data (e.g., sensor data, random range data, etc.). The type of information stored by the memory 108 may be varied according to the design criteria of a particular implementation.

The circuit 112 may be output control. The circuit 114 may be an input interface. The circuit 116 may be a battery. The apparatus 100 may have an optional camera and/or other sensors. For example the apparatus 100 may comprise the camera in order to implement a smart security light. The output control 112 may output control signals used to activate/deactivate various components (e.g., the sensors such as the camera). The output control 112 may output the control signal to activate/deactivate the light, dim the light and/or flash (e.g., strobe) the light. In input interface 114 may receive input from the various sensors (e.g., signals indicating that motion has been detected by a motion detector, signals indicating an amount of light from a photo-diode, audio input signals from a microphone, input from other smart devices, etc.). The sensors may be connected via a mesh network, controlled by an application on the mobile device 150 and/or an application on the hard-wired device 150'.

The processor 102 may be configured to control a light based on the pre-defined conditions 110b. The processor 102 may determine a location of the apparatus 100 based on an identifier 106. The processor 102 may be configured to synchronize to a universal clock via the network 52. The processor 102 may determine a local time based on the universal clock and the location. For example, both the universal clock and/or the location may be received from the mobile device 150 and/or the hard-wired device 150'. The processor 102 may receive input from the mobile device 150 and/or the hard-wired device 150'. The processor 102 may calculate the pre-defined conditions based on the local time and the input from the mobile device 150. In some embodiments, the pre-defined conditions may be based on other data (e.g., a random adjustment and/or thresholds corresponding to various sensors). The processor 102 may be configured to determine whether the pre-defined conditions have been met.

The communications module 104 may be configured to connect to the network 52 based on a communications protocol. The communications module 104 may be configured to connect to devices (e.g., the mobile device 150 and/or the desktop computer 150') based on a communications protocol. The number of connections and/or the protocols implemented for communication may be varied according to the design criteria of a particular implementation.

Figure 4:
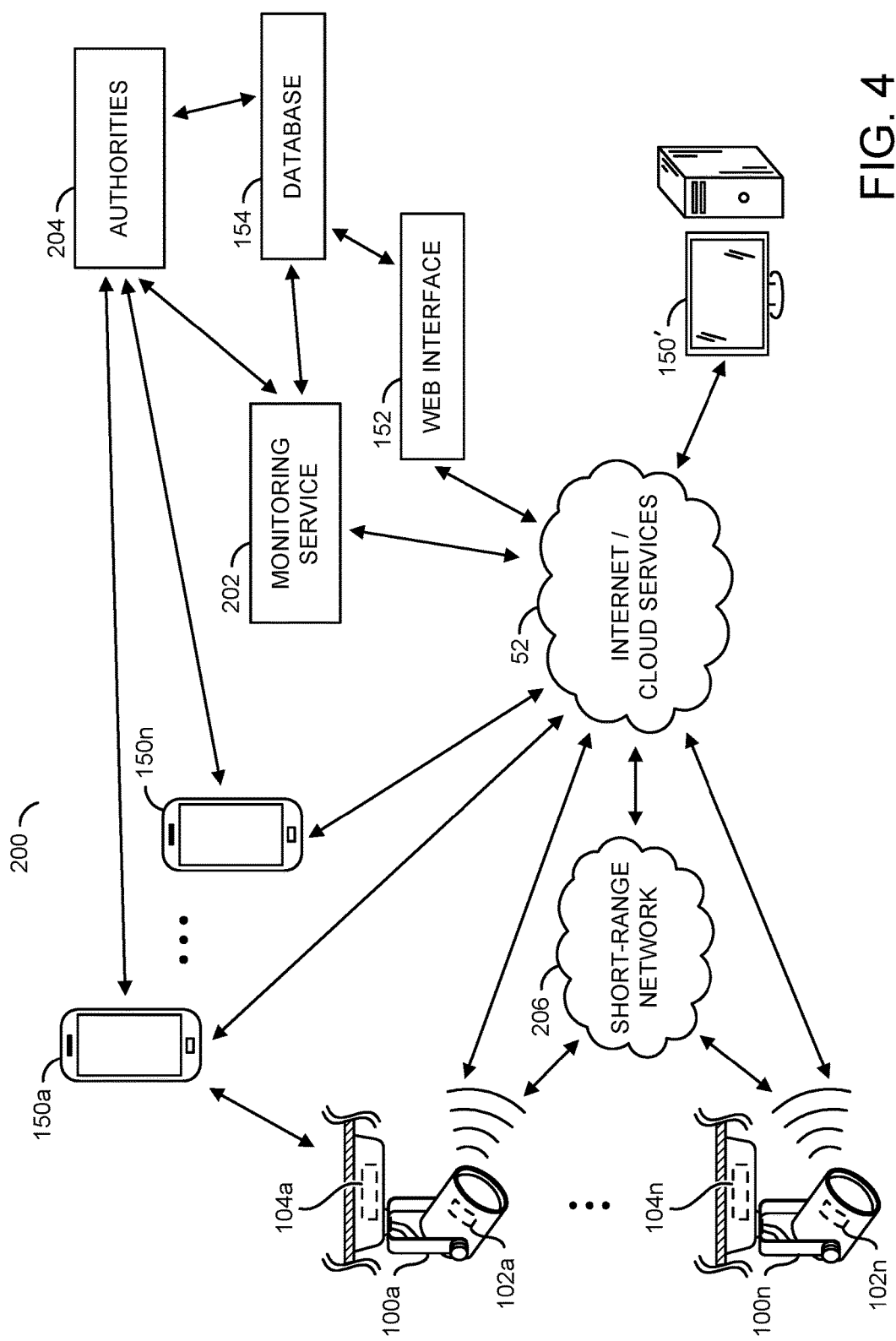
FIG. 4 is a diagram illustrating network connections of the invention.

Referring to FIG. 4, a diagram 200 illustrating network connections of the apparatus 100 is shown. The light fixtures 100a-100n are shown connected to the internet 52. The light fixtures 100a-100n may connect to the internet 52 in order to connect with a monitoring service 202 and/or authorities 204 (e.g., police and/or emergency services). Other types of services may be available to the light fixtures 100a-100n based on the design criteria of a particular implementation.

The light fixtures 100a-100n are shown connected to each other via a short-range network 206. The short-range network 206 may be implemented using a communications protocol (e.g., Bluetooth, ZigBee, Wi-Fi, etc.). The type of communications used for the short-range network 206 may be varied according to the design criteria of a particular implementation.

The cloud service 52 may be a service configured to provide storage and/or processing configured to scale based on demand (e.g., more resources are made available as storage and/or processing is needed). In an example, a user profile may be stored by the cloud service 52. The user profile may be configured to store settings and/or preferences for the light fixture 100 and/or the user schedule customization (e.g., the weekday schedule, the weekend schedule, the random adjustment, motion settings, offset values, etc.). The cloud service 52 may allow the user to synchronize settings and/or access settings from multiple mobile devices 150a-150n and/or the hard-wired device 150'. In some embodiments, data used by the cloud service 52 may be stored in the database 154. In an example, the cloud service 52 may enable the light fixtures 100a-100n to synchronize with the universal time (e.g., update the time and/or receive information about the local dusk time and/or the local dawn time).

The web interface 152 may provide a front end interface to access the cloud service 52 and/or data stored in the database 154. In an example, the web interface 152 may be implemented as an interface designed for use on the mobile devices 150a-150n (e.g., an app). In another example, the web interface 152 may be implemented as an interface designed for use on the hard-wired device 150' (e.g., a web page viewable using a web browser). The web interface 152 may enable the user to select settings and/or edit user preferences.

The database 154 may provide storage. In an example, the database 154 may store user settings and/or user preferences. In another example, the database 154 may be configured to store data accessible by the monitoring service 202 and/or the authorities 204 (e.g., images of suspicious people, video archives for evidence, customer information, billing information, etc.). The database 154 may be accessed as part of the cloud service 52. In an example, the user may select an option using the web interface 152 and the change may be updated in the database 154. The amount and/or type of data stored in the database 154 may be varied according to the design criteria of a particular implementation.

The monitoring service 202 may be a security service. In an example, the monitoring service 202 may be a 3rd party used to monitor the home where the light fixtures 100a-100n are installed. The monitoring service 202 may be optional. In an example, the monitoring service 202 may charge a monthly fee to monitor the home of the user (e.g., respond to alerts, review video footage captured by a camera of the light fixtures 100a-100n, communicate with visitors via a 2-way intercom implemented by the light fixtures 100a-100n, etc.). The monitoring service 202 may provide service tiers based on an amount paid (e.g., more services become available for a higher fee). The monitoring service 202 may have access to the database 154. The monitoring service 202 may be able to contact the authorities 204 (e.g., when a break-in is detected).

The authorities 204 may be one or more entities that respond to events (e.g., police, fire department, ambulances, etc.). In an example, the authorities 204 may be the police when a break-in is detected by the light fixtures 100a-100n. In another example, the authorities 204 may be the fire department when a fire and/or smoke is detected by the light fixtures 100a-100n. In yet another example, the authorities 204 may be paramedics when an injury and/or medical emergency is detected by the light fixtures 100a-100n. The authorities may have access to the database 204. In some embodiments, the authorities may be contacted by the monitoring service 202 (e.g., to prevent false alarms). The conditions that result in the authorities 204 being contacted may be varied according to the design criteria of a particular implementation.

The short-range network 206 may be implemented to allow the light fixtures 100a-100n to communicate with each other and/or to communicate with the mobile devices 150a-150n. In an example, the short-range network 206 may be a local network (e.g., a home Wi-Fi network, a home Ethernet network, a mesh network, etc.). The short-range network 206 may enable the light fixtures 100a-100n to communicate (e.g., transfer data) without accessing an external network (e.g., the Internet/cloud service 52). The type of data transmitted over the short-range network 206 may be varied according to the design criteria of a particular implementation.

Figure 5:
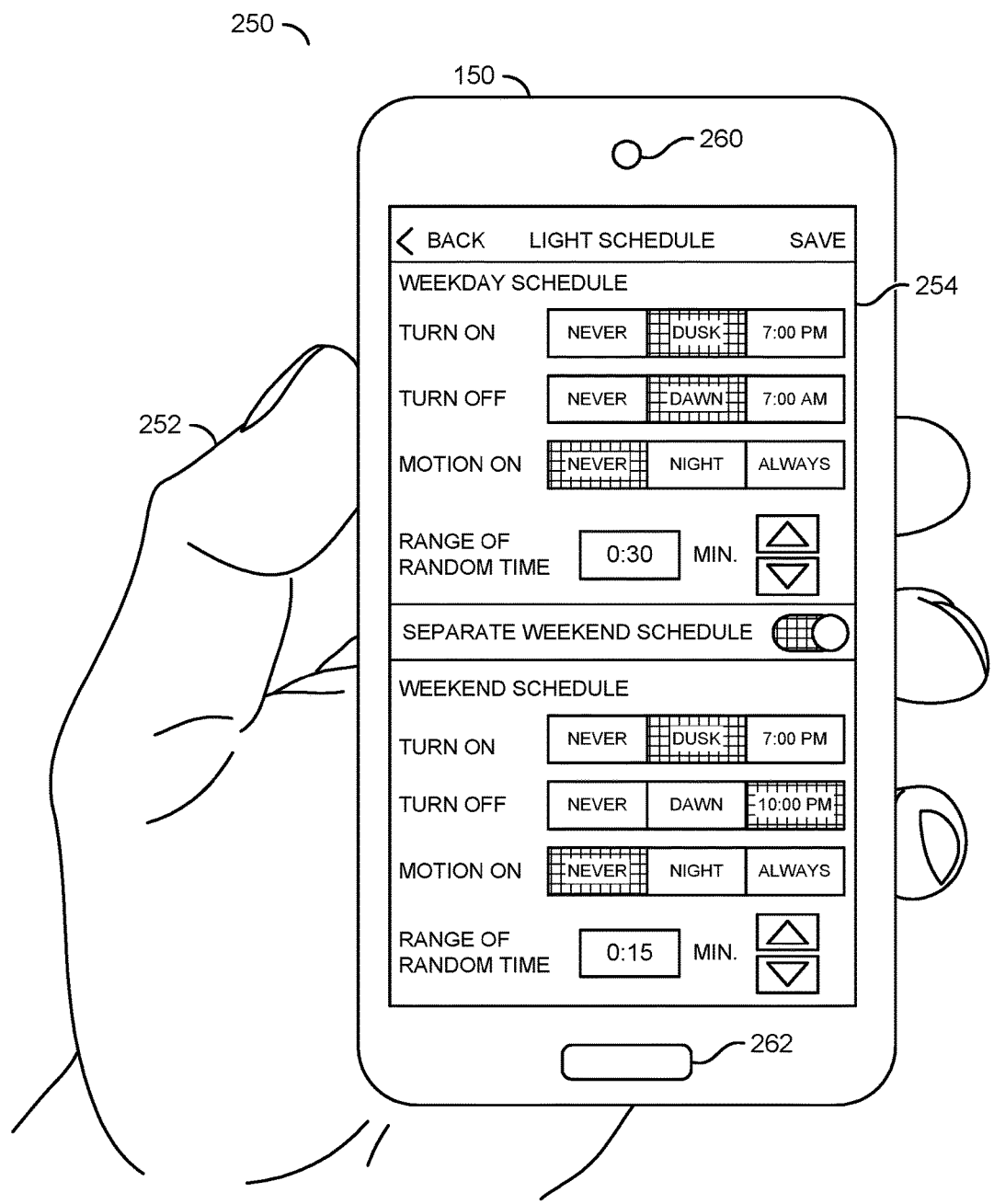
FIG. 5 is a diagram illustrating an example input from a mobile device.

Referring to FIG. 5, a diagram 250 illustrating example input for the mobile device 150 is shown. The user 252 is shown holding the mobile device 150. The mobile device 150 is shown comprising an interface 254, a speaker 260 and/or a microphone 262. A similar interface 254 may be available for the hard-wired device 150'. In an example, the hard-wired device 150' may access the web interface 152 that may have a layout similar to the interface 254.

The interface 254 is shown providing input options for the user 252. For example, a weekday schedule and a weekend schedule are available to the user 252. Input options may allow the user 252 to turn on a light and/or turn off a light at particular times. For example, the user 252 may select an option to turn on the light at dusk and turn off the light at dawn. In another example, the user 252 may select an option to turn on the light at a particular time (e.g., 7:00 PM). In some embodiments, the user 252 may select an option for detecting motion control.

In some embodiments, the user 252 may select an option for a range of random time. The range of random time may be used to add or subtract a random value within the random range of time from the pre-selected times (e.g., the turn on time and/or the turn off time). Adding and subtracting a random value within the range of random time may allow the apparatus 100 to simulate (e.g., approximate) human behavior when activating/deactivating lights (e.g., people tend to turn lights on and off at different times each day).

Figure 6:
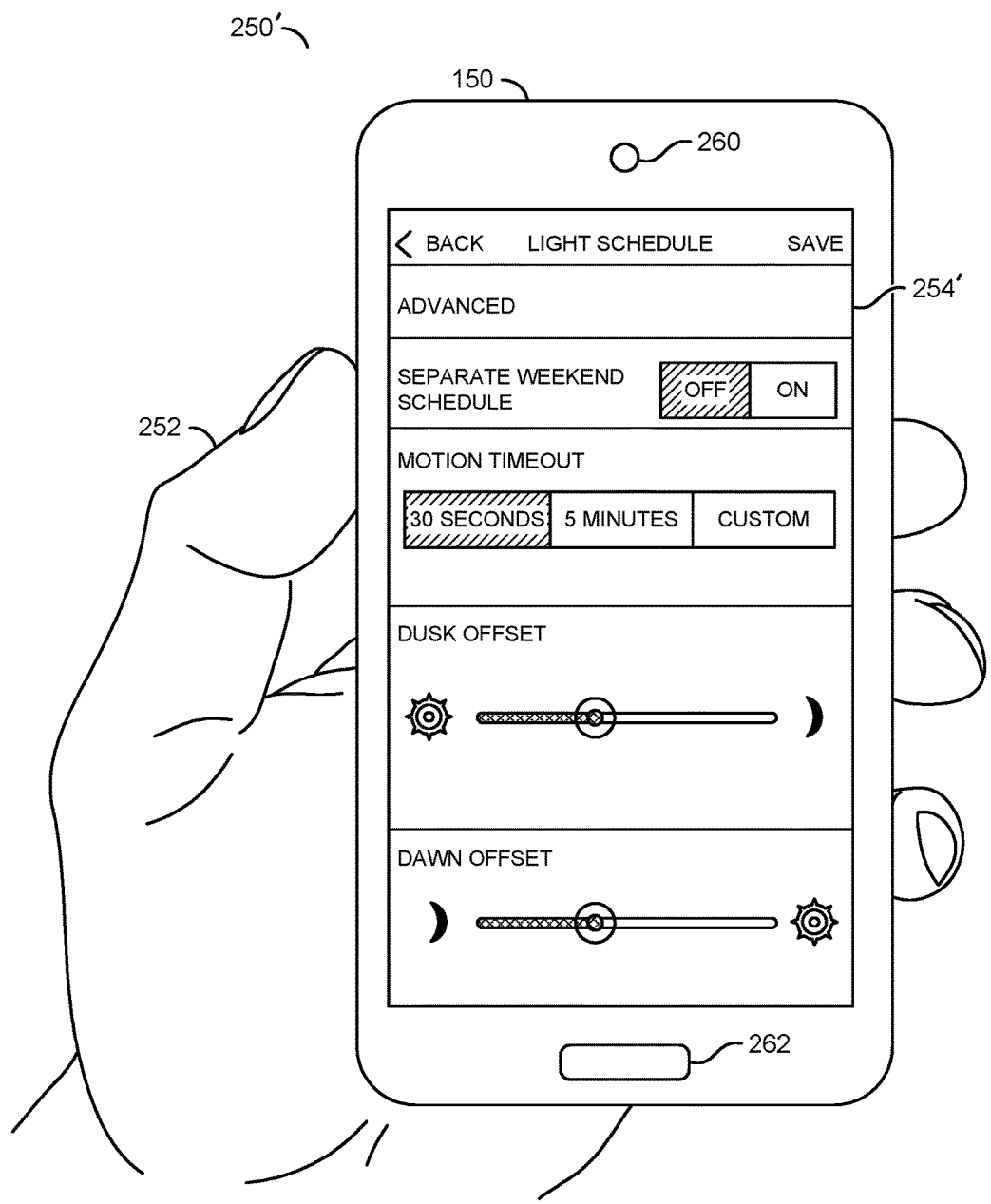
FIG. 6 is a diagram illustrating an example light schedule interface from a mobile device.

Referring to FIG. 6, a diagram 250' illustrating an example light schedule interface 254' on the mobile device 150 is shown. The hard-wired device 150' may have access to a similar light schedule interface. The light schedule interface 254' may enable a dusk offset and/or dawn offset functionality.

In some embodiments, the light schedule interface 254' may provide an option for a separate lighting schedule for the weekend. Habits of a homeowner tend to be different over the weekend compared to weekdays. In an example, a homeowner may stay awake later during the weekend and/or wake up earlier during weekdays. An additional interface screen may be available for setting the alternate lighting schedule for the weekend.

In some embodiments, the light schedule interface 254' may provide an option for motion timeout. The motion timeout may control an amount of time before the light fixture 100 turns off the light after motion has no longer been detected by the light fixture 100. Pre-defined options may be available (e.g., 30 seconds, 5 minutes). The user 252 may have an option to input a custom amount of time.

The light schedule interface 254' may enable the user 252 to customize a time of dusk and/or dawn. The user 252 may input an offset value for dusk and/or dawn. In one example, for the dusk offset, the offset value may be a number of minutes before or after sunset (e.g., based on the dusk time received from the universal clock from the network 52). In another example, for the dawn offset, the offset value may be a number of minutes before or after dawn (e.g., based on the dawn time received from the universal clock from the network 52). In yet another example, the dusk and/or dawn offset may be quantified as a zenith angle.

In some embodiments, the dusk and/or dawn offset may be selected by the user 252 on the light schedule interface 254' using a slider input. In an example, the user 252 may tap the slider using a finger for the dusk offset or the dawn offset and drag the finger across the interface 254' to increase or decrease the offset value. The interface 254' may provide visual feedback for the input. Similarly, for the hard-wired device 150' the user 252 may use a mouse to drag a slider bar for the offset value. Other types of input may be provided to set the offset value. For example, entering numerical values, clicking/tapping up/down arrows, selecting pre-defined values, and/or providing voice input (e.g., voice recognition may be implemented) may be used to input the offset value.

Figure 7:
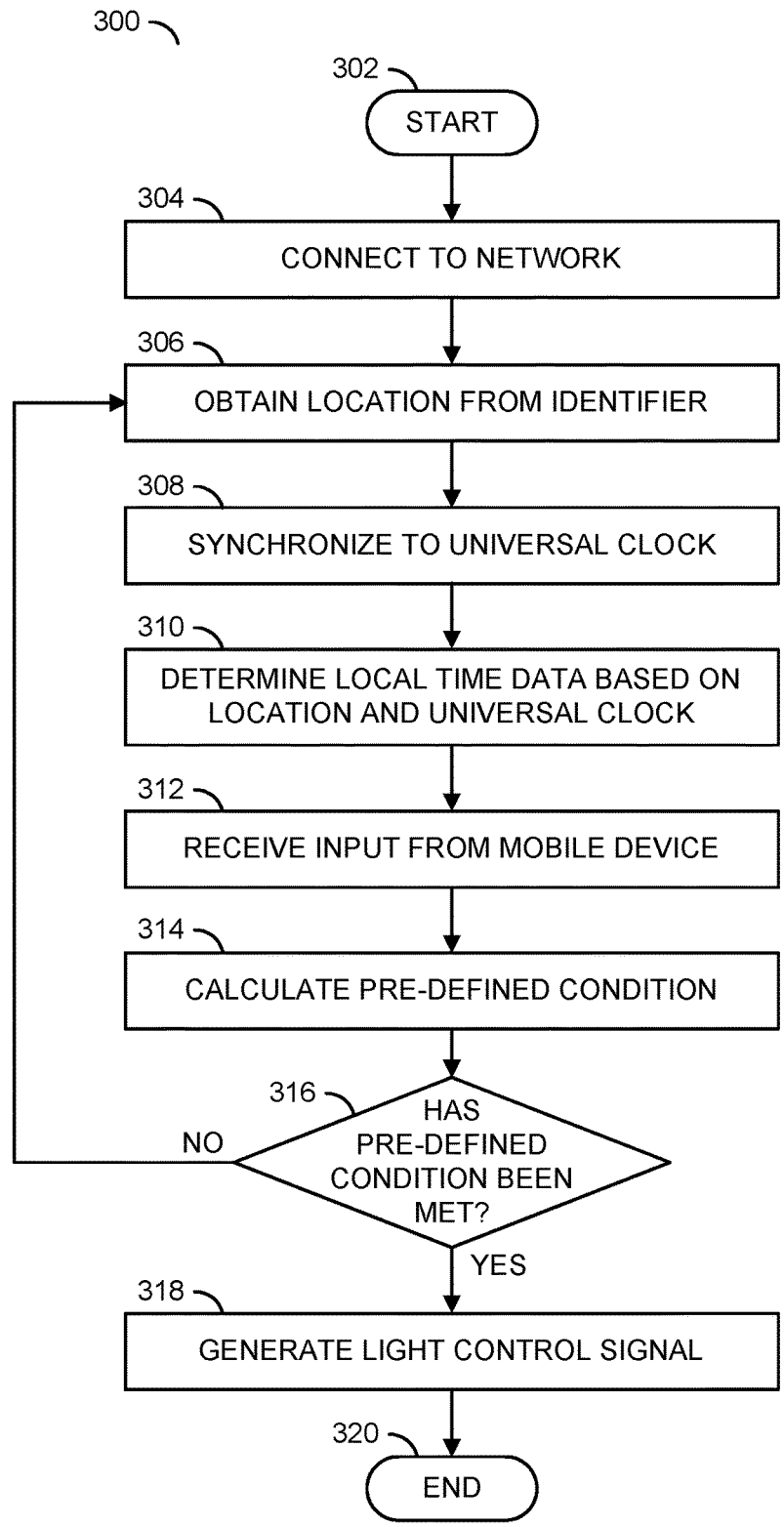
FIG. 7 is a flow diagram illustrating controlling a light based on a pre-defined condition.

Referring to FIG. 7, a method (or process) 300 is shown. The method 300 may control a light based on a pre-defined condition. The method 300 generally comprises a step (or state) 302, a step (or state) 304, a step (or state) 306, a step (or state) 308, a step (or state) 310, a step (or state) 312, a step (or state) 314, a decision step (or state) 316, a step (or state) 318, and a step (or state) 320.

The state 302 may start the method 300. Next, in the state 304, the communications module 104 may connect the light fixture 100 to the network 52. In the state 306, the communications module 104 may transmit the device identifier 106 (e.g., an IP address, a MAC address, etc.) to the network 52 and the network 52 may determine the location of the light fixture 100 (e.g., a time-zone, a geographical region, etc.). The location may be stored by the light fixture 100 as the location data 110c. In the state 308, the light fixture 100 may synchronize with the universal clock received from the network 52 (e.g., stored in the clock data 110a). Next, in the state 310, the processor 102 may determine the local time data based on the location data 110c and the universal clock stored in the clock data 110a.

In the state 312, the communications module 104 may receive input from the mobile device 150. In an example, the input may comprise the weekday schedule, the weekend schedule, the random range of time, the motion timeout, the dusk offset (e.g., in minutes or as an azimuth angle), the dawn offset (e.g., in minutes or as an azimuth angle), etc. Next, in the state 314, the processor 102 may calculate the pre-defined conditions (e.g., stored in the conditions data 110b). In one example, the processor 102 may calculate the time to turn off the lights (e.g., the pre-defined condition) based on the local time, the dusk time, the range of random time and/or the dusk offset value. Next, the method 300 may move to the decision state 316.

In the decision state 316, the processor 102 may determine whether the pre-defined condition has been met. If the pre-defined condition has not been met, the method 300 may return to the state 306. In the pre-defined condition has been met, the method 300 may move to the state 318. In the state 318, the processor 102 may generate the control signal. In an example, the control signal may be sent via the output control 112. Next, the method 300 may move to the state 320. The state 320 may end the method 300.

Figure 8:
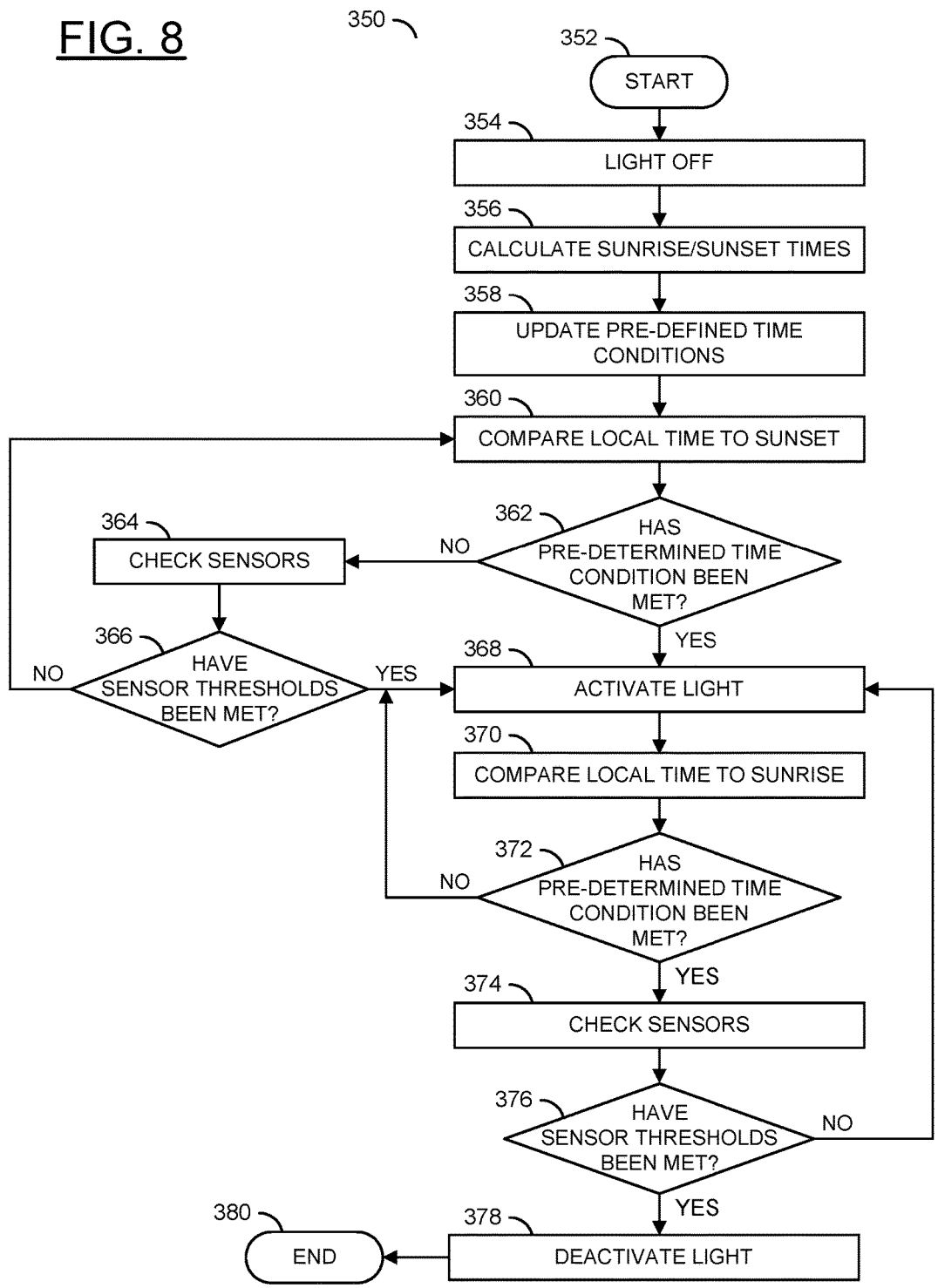
FIG. 8 is a flow diagram illustrating controlling a light based on sensor thresholds.

Referring to FIG. 8, a method (or process) 350 is shown. The method 350 may control a light based on sensor thresholds. The method 350 generally comprises a step (or state) 352, a step (or state) 354, a step (or state) 356, a step (or state) 358, a step (or state) 360, a decision step (or state) 362, a step (or state) 364, a decision step (or state) 366, a step (or state) 368, a step (or state) 370, a decision step (or state) 372, a step (or state) 374, a decision step (or state) 376, a step (or state) 378, and a step (or state) 380.

The state 352 may start the method 350. In the state 354, the light may be off. In the state 356, the processor 102 may calculate the sunrise/sunset times (e.g., based on the clock data 110a, the location data 110c and/or the other data 110n). Next, in the state 358, the processor 102 may update the pre-defined time conditions in the condition data 110b. In the state 360, the processor 102 may compare the local time to the calculated sunset time. Next, the method 350 may move to the decision state 362.

In the decision state 362, the processor 102 may determine whether the pre-determined time condition (e.g., the sunset time) has been met. If the pre-determined has not been met, the method 350 may move to the state 364. In the state 364, the processor 102 may check information from various sensors received by the input interface 114 (e.g., information from the photo-diode, information from the motion detector, information from the microphone, etc.). Next, the method 350 may move to the decision state 366. In the decision state 366, the processor 102 may determine whether the sensor thresholds have been met (e.g., whether the environment is dark enough, whether enough motion has been detected, whether an audio level of the input is high enough, etc.). If the sensor thresholds have not been met, the method 350 may return to the state 360. If the sensor thresholds have been met, the method 350 may move to the state 368. In the decision state 362, if the pre-determined time condition has been met, the method 350 may move to the state 368.

In the state 368, the processor 102 may generate the control signal and the output control 112 may send the control signal to activate the light. In the state 370, the processor 102 may compare the local time to the calculated sunrise time (e.g., calculated in the state 356). Next, the method 350 may move to the decision state 372.

In the decision state 372, the processor 102 may determine whether the pre-determined condition has been met (e.g., the sunrise time). If the pre-determined condition has not been met, the method 350 may return to the state 368. If the pre-determined condition has not been met, the method 350 may move to the state 374. In the state 374, the processor 102 may check information from various sensors received by the input interface 114 (e.g., information from the photo-diode, information from the motion detector, information from the microphone, etc.). Next, the method 350 may move to the decision state 376.

In the decision state 376, the processor 102 may determine whether the sensor thresholds have been met (e.g., whether the environment is light enough, whether enough motion has been detected, whether an audio level of the input is high enough, etc.). If the sensor thresholds have not been met, the method 350 may return to the state 368. If the sensor thresholds have been met, the method 350 may move to the state 378. In the state 378, the processor 102 may generate the control signal and the output control 112 may send the control signal to deactivate the light. Next, the method 350 may move to the state 380. The state 380 may end the method 350.

Figure 9:
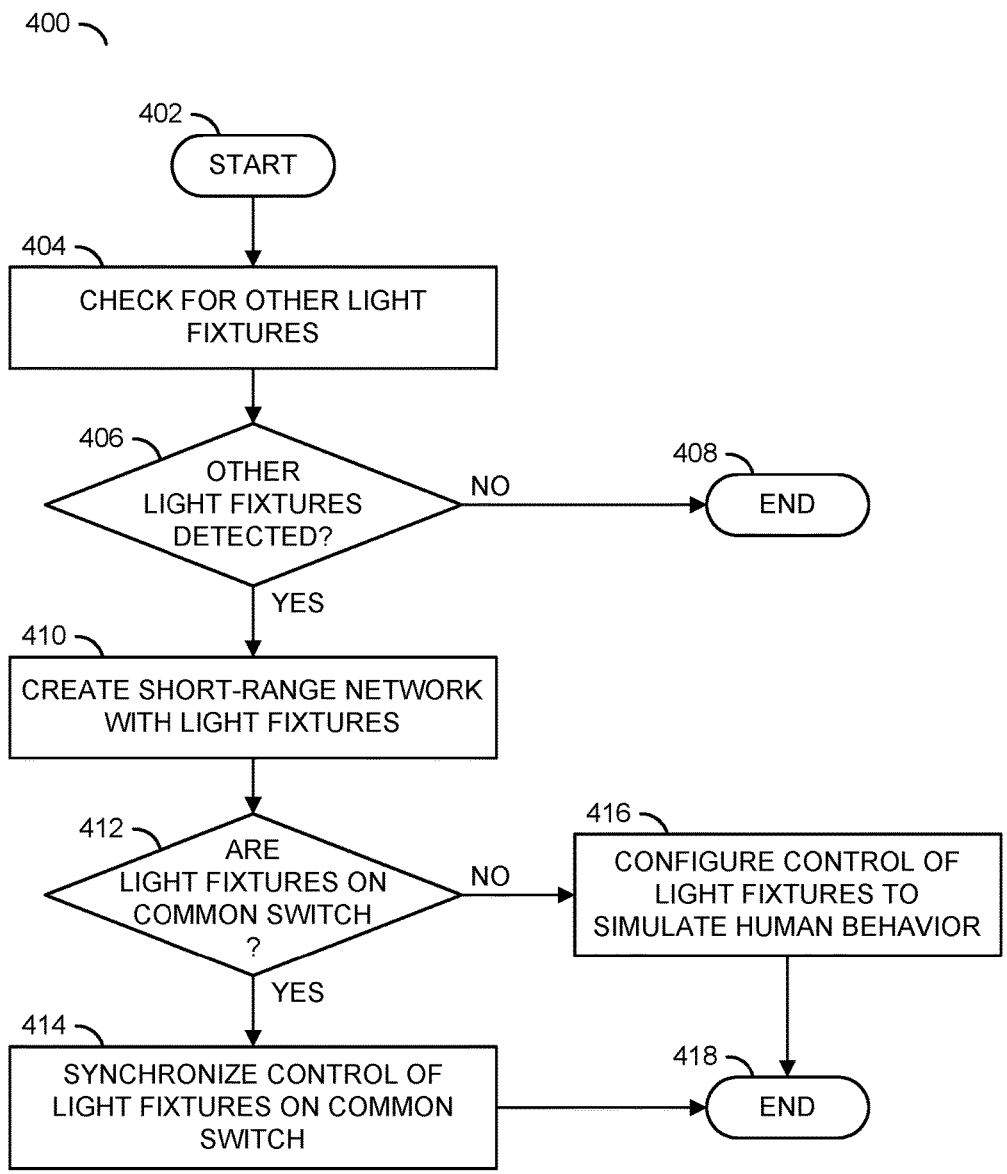
FIG. 9 is a flow diagram illustrating creating a mesh network of two or more light fixtures.

Referring to FIG. 9, a method (or process) 400 is shown. The method 400 may create a mesh network of two or more light fixtures. The method 400 generally comprises a step (or state) 402, a step (or state) 404, a decision step (or state) 406, a step (or state) 408, a step (or state) 410, a decision step (or state) 412, a step (or state) 414, a step (or state) 416, and a step (or state) 418.

The state 402 may start the method 400. In the state 404, the communications module 104 may check for other installed light fixtures 100a-100n. Next, the method 400 may move to the decision state 406. In the decision state 406, the processor 102 may determine whether the other light fixtures 100a-100n have been detected. If the other light fixtures 100a-100n have not been detected, the method 400 may move to the state 408. The state 408 may end the method 400. If the other light fixtures 100a-100n have been detected, the method 400 may move to the state 410. In the state 410, the communication modules 104 of the light fixtures 100a-100n may create the short-range network 206 (e.g., or join an existing short-range network). Next, the method 400 may move to the decision state 412.

In the decision state 412, the processor 102 may determine whether one or more of the light fixtures 100a-100n are on a common switch. If one or more of the light fixtures 100a-100n are on a common switch, the method 400 may move to the state 414. In the state 414, the processors 102 of the light fixtures 100a-100n that are on the common switch may synchronize control of the light fixtures 100a-100n (e.g., to allow the lights for each of the light fixtures 100a-100n on the common switch to activate/deactivate at the same time). Next, the method 400 may move to the state 418. In the decision state 412, if one or more of the light fixtures 100a-100n are not on a common switch, the method 400 may move to the state 416. In the state 416, the processors 102 of the one or more light fixtures 100a-100n that are not on the common switch may be configured to simulate human behavior (e.g., the lights may be activated/deactivate with a delay in between each activation/deactivation of the light fixtures 100a-100n to appear as if a person is walking around the home and flipping light switches). Next, the method 400 may move to the state 418. The state 418 may end the method 400.

Figure 10:
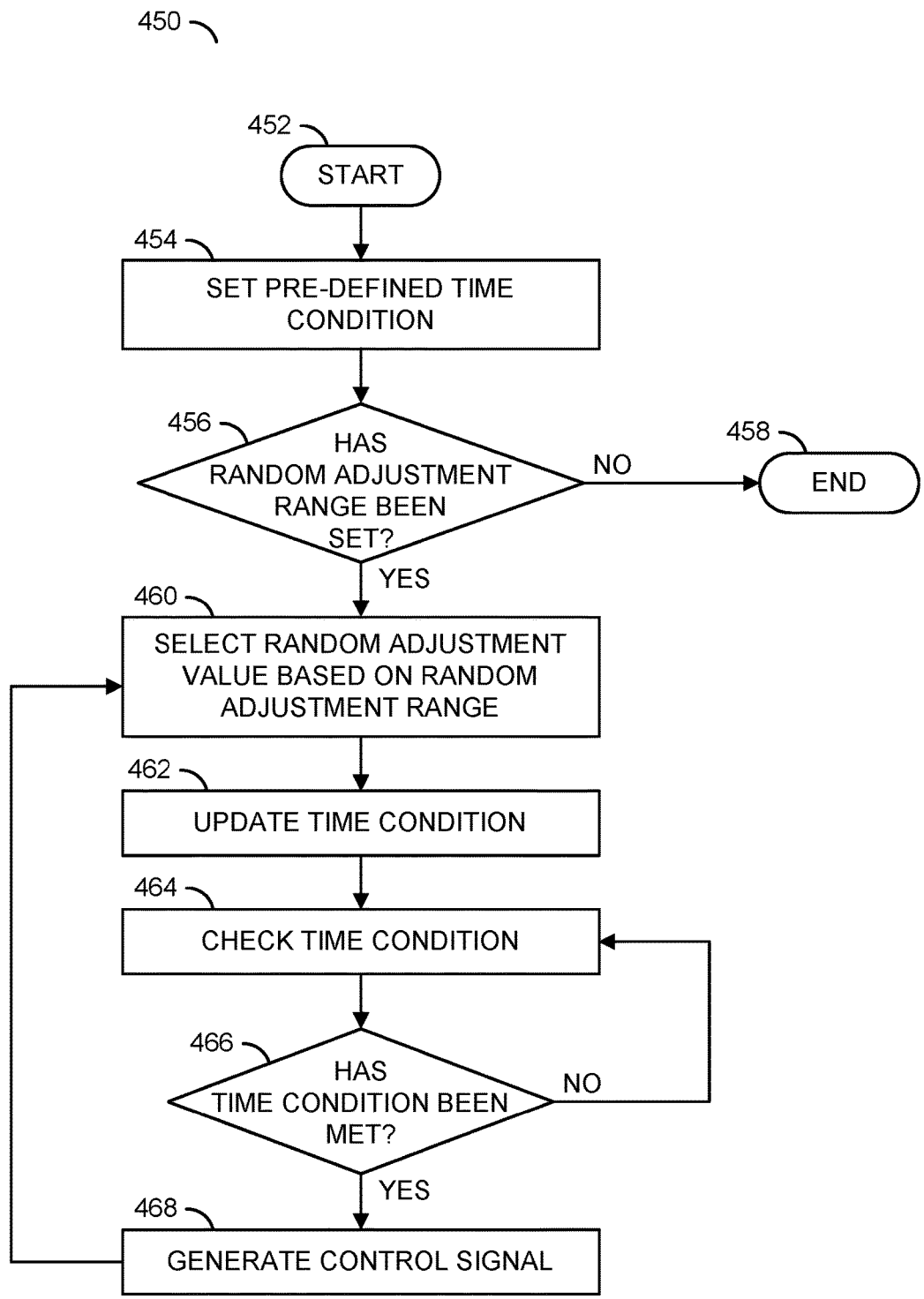
FIG. 10 is a flow diagram illustrating adjusting a pre-defined condition using a random range.

Referring to FIG. 10, a method (or process) 450 is shown. The method 450 may adjust a pre-defined condition using a random range. The method 450 generally comprises a step (or state) 452, a step (or state) 454, a decision step (or state) 456, a step (or state) 458, a step (or state) 460, a step (or state) 462, a step (or state) 464, a decision step (or state) 466, and a step (or state) 468.

The state 452 may start the method 450. In the state 454, the user 252 may set the pre-defined time condition using the light schedule interface 254. For example, the user 252 may set the light bulb to activate at dusk and deactivate at dawn on the weekdays. The pre-defined condition may be stored as the conditions data 110b. Next, the method 450 may move to the decision state 456.

In the decision state 456, the processor 102 may determine whether the random adjustment range has been set (e.g., by the user 252 on the light schedule interface 254). If the random adjustment range has not been set, the method 450 may move to the state 458. The state 458 may end the method 450. If the random adjustment range has been set, the method 450 may move to the state 460. In the state 460, the processor 102 may select a random adjustment value based on the random adjustment range selected by the user 252 and stored as part of the other data 110n. Next, in the state 462, the processor 102 may update the time condition stored in the conditions data 110b (e.g., to reflect the random adjustment selected in the state 460). Next, the processor 102 may check the time condition stored in the condition data 110b. Next, the method 450 may move to the decision state 466.

In the decision state 466, the processor 102 may determine whether the time condition has been met. For example, the processor 102 may compare the time condition stored in the condition data 110b to the clock data 110a (e.g., the local time). If the time condition has not been met, the method 450 may return to the state 464. If the time condition has been met, the method 450 may move to the state 468. In the state 468, the processor 102 may generate the control signal (e.g., to activate or deactivate the light bulb). The control signal may be sent to the light bulb by the output control 112. Next, the method 450 may return to the state 460.

Figure 11:
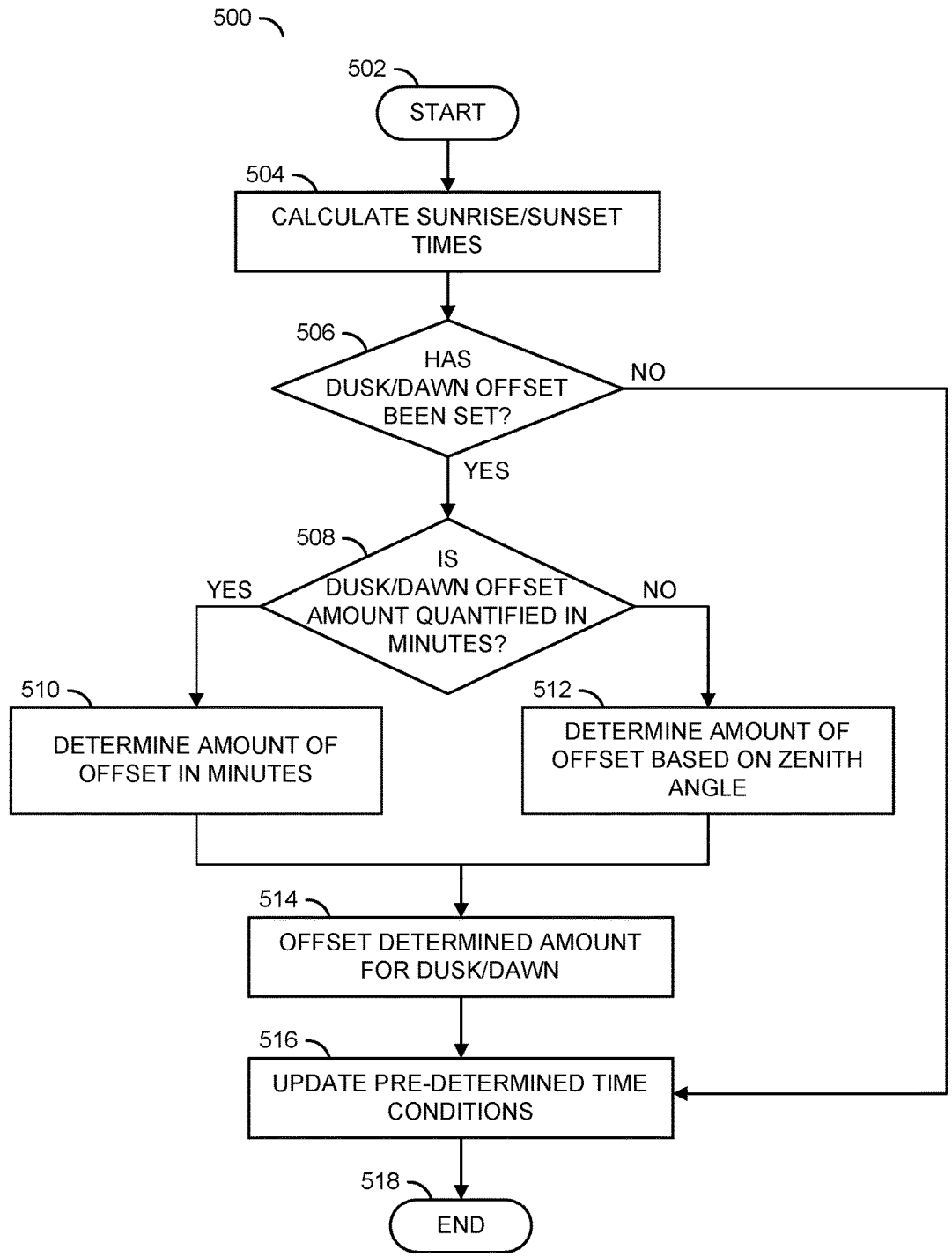
FIG. 11 is a flow diagram illustrating determining a dusk/dawn offset.

Referring to FIG. 11, a method (or process) 500 is shown. The method 500 may determine a dusk/dawn offset. The method 500 generally comprises a step (or state) 502, a step (or state) 504, a decision step (or state) 506, a decision step (or state) 508, a step (or state) 510, a step (or state) 512, a step (or state) 514, a step (or state) 516, and a step (or state) 518.

The state 502 may start the method 500. In the state 504, the processor 102 may calculate the sunrise/sunset times (e.g., based on the clock data 110a, the location data 110c and/or the other data 110n). Next, the method 500 may move to the decision state 506. In the decision state 506, the processor 102 may determine whether the dawn and/or dusk offset has been set (e.g., by the user 252 on the light schedule interface 254'). If the dusk and/or dawn offset has not been set, the method 500 may move to the state 516. If the dusk and/or dawn offset has been set, the method 500 may move to the decision state 508.

In the decision state 508, the processor 102 may determine whether the offset amount is quantified in minutes. In an example, the user 252 may input the dusk offset value and/or the dawn offset value using the light schedule interface 254' and the offset value may be receive using the communications module 104. If the dusk and/or dawn offset has been quantified in minutes, the method 500 may move to the state 510. In the state 510, the processor 102 may determine the amount of the offset value in minutes. Next, the method 500 may move to the state 514. In the decision state 508, if the dusk and/or dawn offset value has not been quantified in minutes, the method 500 may move to the state 512. In the state 512, the processor 102 may determine the amount of the offset value based on the zenith angle. Next, the method 500 may move to the state 514.

In the state 514, the processor 102 may perform an offset of the dusk/dawn (e.g., sunset/sunrise) time by an amount corresponding to the offset value. Next, in the state 516, the processor 102 may update the pre-determined time conditions stored in the condition data 110b. Next, the method 500 may move to the state 518. The state 518 may end the method 500.

The apparatus 100 may implement an automatic ON and OFF control for a light. For example, the apparatus 100 may be implemented as an outdoor light fixture mounted on a wall. In another example, the apparatus 100 may be a light fixture mounted on a ceiling. The light fixture 100 may provide a combination of home security and energy saving.

The light fixture 100 may obtain location information from an external source. In an example, the light fixture 100 may use the communications module 104 to connect to the network 52 in order to perform an IP address lookup, receive coordinates from a GPS beacon of the mobile device 150 and/or determine location from a query of the database 154. Using the location information, the light fixture 100 may obtain time zone/UTC offset values and store the values in the memory 108. Using the stored UTC offset the processor 102 may determine the current date and time and store the data in the memory 108. Using the stored location and current date, the processor 102 may calculate sunrise and sunset times. The light fixtures 100a-100n (e.g., located indoors and/or outdoors) may communicate wirelessly over the short-range network 206. The light fixtures 100a-100n may be turned off or on to make a home and/or business appear occupied by an actual person, even when a person is not home to control the lights.

The web interface 152 may be used to access the database 154. Using the web interface 152 and/or the database 154, the user 252 may access an easy-to-use calendar and/or scheduling interface. Information in the calendar may be used to define conditions for the light fixture 100 to turn the lights on or off (e.g., the conditions data 110b). In an example, the processor 102 may generate control signals to activate/deactivate the lights in response to data in the calendar.

In some embodiments, the light fixture 100 may be configured to detect Bluetooth signals via the communications module 104 to receive MAC addresses of the cell phones 150a-150n. The processor 102 may analyze the MAC addresses to determine if a person carrying the phone is a stranger. For example, the processor 102 may receive input from a sensor (e.g., a device recognition sensor) configured to check a device identification to determine whether the device (e.g., a cell phone, an RFID card, etc.) is a recognized device or an unknown device (e.g., a device carried by a stranger). In some embodiments, the memory 108 may store external identifiers (e.g., identifiers from external devices such as smartphones to allow the light fixture 100 to recognize the external devices). In some embodiments, the light fixture 100 may further combine data from various sensors (e.g., photo-diodes, motion sensors, cameras, etc.) to intelligently control outdoor lighting and/or indoor lighting for security and saving energy. The processor 102 may be configured to control the lights in a way that simulates (or approximates) human behavior when controlling the outdoor and/or indoor lights throughout the day.

The processor 102 and the communication module 104 may provide intelligence and/or a communications ability to the light fixture 100 in order to connect to the Internet 52 to become part of the Internet of Things. For example, the communications module 104 may implement one or more of Wi-Fi and/or cellular technology. In some embodiments, the light fixtures 100a-100n may communicate with each other using the short range network 206. The device identifier 106 may provide a unique identifier (e.g., a MAC address, an IP address, an input from the user 252, etc.) for each of the light fixtures 100a-100n. The location of each of the light fixtures 100a-100n may be stored as the location data 110c in the memory 108. The device identifier 106 may be transmitted by the communications module 104 to a third-party such as the monitoring service 202. In an example, the location data 110c may be obtained from the user 252 (e.g., through an input device such as the cell phone 150). In another example, the location data 110c may be obtained from the third-party and/or an internet service.

Based on the location data 110c, the processor 102 may accurately calculate the time of dusk and dawn (e.g., down to a second of accuracy). In another example, the time of dusk and down may be determined from the database 154 and/or the cloud services 52 (e.g., the time and date information may be downloaded from the internet 52 to the light fixture 100). The clock data 110a may be synchronized with the universal accepted UTC clock via the internet 52. A time zone may be determined by providing the IP address to an external service and/or through downloading the time zone information from the connected database 154.

The light fixture 100 may provide a more accurate control of light activation/deactivation for dusk to dawn and/or dusk to bedtime than relying on sensors such as a photo-diode and/or an image sensor with a delay timer. In some embodiments, light control for dusk to bedtime may be preferable to dusk to dawn light control (e.g., for energy savings). The light fixture 100 may further implement a photo-diode and/or an image sensor to provide additional options for controlling the activation/deactivation of the light (e.g., for rare conditions such as when daytime is very dark due to stormy weather and/or in conditions where the light is in a darker ambient environment that experiences earlier loss of light than at sunset time). Using the additional information from the sensors (e.g., the photo-diode and/or the camera), the processor 102 may reduce false detection of sunrise and/or sunset.

The processor 102 may further calculate a random bedtime within a short duration of a pre-set bedtime (e.g., to further approximate human behavior such as a bedtime procedure). The random amount of time and the pre-set bedtime may be programmed by the user 252 using the interface 254 (or the web interface 152). For example, the memory 108 may store the random time and/or the bedtime. In another example, the cloud service 52 may synchronize the settings for the random time and/or the pre-set bedtime with the database 154. The light fixtures 100a-100n may be paired with each other using the short-range network 206. For paired devices on the same light switch, the light fixtures 100a-100n may be synchronous to within 1 second. For some of the paired devices around the house, the light fixtures 100a-100n may be programmed to turn off as if a person is walking from one light switch to another (e.g., a delay may be implemented in between turning off a first light and the next light).

The light fixture 100 may be configured to activate the light after the light has been turned off (e.g., at night, after bedtime, etc.). For example, the light fixture 100 may further implement a motion detector and/or an audio sensor (e.g., microphone) to detect loud sounds (e.g., the motion detector and/or microphone may provide input to the processor 102 and the processor 102 may turn on the outdoor light in response to input from the motion detector and/or the microphone). Using the short-range network 206, detected motion and/or a loud sound may activate pre-selected indoor lights. The pre-selected indoor lights may implement compatible wireless signals (e.g., Wi-Fi, Bluetooth, RF, ZigBee, etc.). Additional security measures may be activated upon detecting motion outdoors after bedtime. For example, an outdoor siren, an indoor siren, calling the central monitoring service 202, calling a friend, calling a trusted person (e.g., a neighbor) and/or contacting the authorities 204 may be implemented as security measures. If a person approaching the light fixture 100 has a cell phone, the MAC address of the phone may be read remotely by the smart light fixture 100. For example, the MAC address that is read may be compared with information in the database 154 to signal if additional security measures should be activated.

In some embodiments, the light fixture 100 may implement a clock (e.g., the clock data 110a). The clock data 110a may determine the time locally (e.g., without accessing the internet 52). Without receiving data from the internet 52 (or a satellite signal to an external clock) maintaining accuracy of the clock data 110a may be difficult (e.g., due to power outages, daylight saving time, accidentally turning off the light switch that provides power to the light fixture 100, etc.). The battery 116 may be implemented to enable the clock data 110a to maintain accuracy when external power in unavailable.

Embodiments of the light fixture 100 may provide location based determination of dusk and dawn times. The user 252 may set a dusk to bedtime schedule that may be randomized and/or have an offset value. The light fixture 100 may provide accurate time and date information that is generally maintenance free. The light fixtures 100a-100n may be configured to communicate wirelessly, including communication between outdoor light fixtures and indoor lights. The light fixtures 100a-100n may be synchronized to be turned off or on based on timing (e.g., the user-defined settings) and provide synchronization (e.g., to within less than one second) for the light fixtures 100a-100n that are on the same power switch. Embodiments, of the light fixture 100 may enable programming a custom on/off schedule that may accept a dusk time, a dawn time, a bed time, and sensor information (e.g., photo-diode, motion, video data from a camera, etc.) as input that may control the light state for any tuple (e.g., day, month, year, etc.).

The light fixture 100 may provide security and/or energy savings for homes, small offices and/or businesses. The light fixture 100 may allow the user 252 to have security without compromising energy savings. The light fixture 100 may be configured to provide security and energy savings both when the user 252 is home and when the user 252 is not home. The web interface 152 and/or the interface 254 may provide a button and/or interface for selecting a range of random time. The interface 254 may allow the user 252 to change the range of random time. For example, a default value of 30 minutes may be provided (e.g., the light may be turned on at any point from 30 minutes before sunset to 30 minutes after sunset).

The communication module 104 may enable the apparatus 100 to implement a BLE/Wi-Fi enabled LED light bulb. The light schedule interface 254 may be implemented as part of a mobile application to enable the user 252 to input information (e.g., the location, time, date, user preferences, etc.) from the mobile device 150 (e.g., a phone, a tablet computing device, a smart watch, etc.) and/or a computer (e.g., a desktop PC) to the BLE/Wi-Fi enabled LED light bulb 100'. A set of mesh-networked BLE/Wi-Fi LED light bulbs 100' may be configured to perform the functionality of the apparatus 100. The motion detection and/or data from other sensors may be received from an existing outdoor light fixture fitted with various sensors (e.g., motion detection, audio detection, RFID, etc.).

The user 252 may use multiple mesh-networked BLE/Wi-Fi LED light bulbs 100' and receive access to an application configured to enable the apparatus 100 (e.g., provide smart security lighting). One or more of the LED light bulbs 100' may be installed in outdoor light fixtures. One or more of the LED light bulbs 100' may be installed indoors. The set of special LED light bulbs 100' may perform the functionality of the apparatus 100. Power to the set of LED bulbs 100' may be switched on for the set of LED light bulbs 100' to automatically turn on/off (e.g., the power switch connected to the light bulbs 100' may be left in the on position during operation). In some embodiments, the apparatus 100 may be a connected light fixture with mesh-networked BLE electronics.

The mobile device 150 may connect directly to the apparatus 100 wirelessly (e.g., using BLE and/or other protocols). The hardwired device 150' may connect to the apparatus 100 either through a wire (e.g., power line communication, Ethernet, etc.) and/or wirelessly. In some embodiments, the apparatus 100 may be a connected light fixture without a camera and/or Wi-Fi. For example, the apparatus 100 may be implemented as a mesh-networked-BLE enabled light fixture with motion detection.

The apparatus 100 may be implemented as a BLE and/or Wi-Fi enabled LED light bulb with a controller (e.g., the processor 102) built in. The apparatus 100 may calculate and/or store the time, date, dusk, dawn, calendar, random range adjustment and/or other information in the memory 108. The apparatus 100 may synchronize wirelessly with the input devices 150 and/or 150'.

In some embodiments, the apparatus 100 may be implemented as a master light fixture and/or a master light bulb. For example, the master light fixture 100 may be implemented with a simple (e.g., inexpensive) processor and/or Wi-Fi/BLE. One or more of the apparatus 100a-100n may be implemented as a child light fixture. The child light fixtures may have fewer components and/or functionality than the master light fixture (e.g., the child light fixture may have a processor with less functionality, may not be able to connect to the internet 52, may have fewer internal sensors, may not track the time, etc.). In some embodiments, the child light fixtures may connect to the master light fixture (e.g., use the communication modules 104 to create the short-ranged network 206). In an example, the light fixture 100a may be the master light fixture and the light fixtures 100b-100n may be child light fixtures. In some embodiments, the master light fixture and the child light fixtures may be pre-selected by the user 252 (e.g., using the interface 254 and/or the web interface 152). The child light fixtures may be controlled together based on the pre-defined conditions. In an example, the master light fixture 100a may determine whether the condition for the dusk time has been met and, using the communications module 104 and/or the short-range network 206, send control signals to the child light fixtures 100b-100n so that the light fixtures 100a-100n are turned off.

A connection to the internet/cloud service 52 may not be necessary since the apparatus 100 may synchronize with the mobile device 150 regularly and/or periodically (e.g., similar to a smart watch syncing up to a smartphone). Tasks that need additional processing power may be performed by the mobile device 150 and the resulting information may be transmitted to the light fixture 100.

In some embodiments, the short-range network 206 may implement a mesh network (e.g., self-healing) using inexpensive smart security light bulbs (e.g., the light bulbs 100'). Using the mesh network 206, each of the smart security lights bulbs 100' may be configured to communicate with other of the smart security light bulbs 100' and/or with registered mobile devices 150a-150n. The mobile device 150a-150n may be configured to connect to the internet 52. The processor 102 inside each of the light bulbs 100' may have a limited functionality (e.g., implementing a reduced instruction set, allowing low power operation and/or allowing inexpensive implementation). For example, the processor 102 may be configured to perform simple calculations for the clock data 110a, the calendar information (e.g., the conditions 110b), pseudo-random number, etc. The processor 102 may be connected to a small amount of non-volatile memory (e.g., the memory 108). More demanding computational operations and/or input by the user 252 may be performed using the mobile devices 150a-150n. The mobile devices 150a-150n may be associated with a web-account (e.g., stored in the database 154) for particular web-services. The mesh network 206 may be configured to synchronize the smart light bulbs 100' and the mobile device 150a-150n at pre-defined intervals (e.g., one month, long enough for a long vacation while the user 252 in not home).

The apparatus 100 may be configured to receive input from various sensors. In some embodiments, the sensors may be implemented as part of the light fixture 100 (e.g., a built-in PIR, a microphone, a camera, etc.). For example, the apparatus 100 may have a connector (e.g., a USB connector) for sensors such as PIR motion sensor, photo-diode, microphone, a camera, etc. In some embodiments, the sensors may be external to the light fixture 100 (e.g., the light fixture 100 may receive information from other smart devices in a household). For example, the mesh network 206 may connect with smart devices such as a smart thermostat (e.g., for temperature readings), smart electricity meters (e.g., for power usage readings), smart smoke detectors, smart carbon monoxide detectors, and/or other smart appliances to gather additional sensor information. The apparatus 100 may also implement a small speaker for announcements and/or a siren. Any peripherals such as the sensors may be optional to the apparatus 100 and/or integrated inside the apparatus 100.

The functions and structures illustrated in the diagrams of FIGS. 1 to 11 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to the preferred embodiments thereof, it will be understood by those skilled in the art that various changes in form and details may be made without departing from the scope of the invention.

The invention claimed is:

1. An apparatus comprising:
   a communication circuit configured to connect to a device based on a wireless communications protocol; and
   a processing circuit configured to (a) receive values from said device connected to said apparatus and (b) control a light, wherein said processing circuit (i) determines a location of said apparatus, (ii) synchronizes to a universal clock, (iii) determines a local time based on (a) said universal clock and (b) said location, both defined by said values received from said device, (iv) calculates a parameter based on (a) a selected time and (b) a range of preset times both defined by said values received from said device and (v) determines whether said local time matches said parameter and (vi) if same local time matches said parameter, turns on said light or turns off said light.

2. The apparatus according to claim 1, wherein said device is implemented as at least one of (a) a mobile device and (b) a device configured to provide a hard-wired connection.

3. The apparatus according to claim 1, wherein said control comprises at least one of (a) dimming, (b) turning on/off and (c) flashing said light.

4. The apparatus according to claim 1, wherein said range of preset times simulates a bedtime procedure of a user.

5. The apparatus according to claim 1, wherein said location of said apparatus is determined based on an identifier comprising at least one of (a) a MAC address, (b) an IP address and (c) user input.

6. The apparatus according to claim 1, wherein at least one of (a) said location and (b) said universal clock is received from a third-party service.

7. The apparatus according to claim 1, wherein said local time is (a) calculated by said processing circuit in a first mode and (b) calculated by a third-party service in a second mode.

8. The apparatus according to claim 1, wherein (i) said processing circuit is further configured to control said light based on a threshold value corresponding to a sensor input and (ii) said sensor input is generated by at least one of (a) a photo-diode, (b) an image sensor, (c) an audio sensor, (d) a motion sensor and (e) a device recognition sensor.

9. The apparatus according to claim 1, wherein (i) said parameter comprises a random adjustment within said range of preset times and (ii) said random adjustment is at least one of (a) a pre-set range selected by a user, (b) a value stored in said apparatus and (c) a value stored in a web-server.

10. The apparatus according to claim 1, wherein two or more of said apparatus are connected to each other through at least one of (i) a network and (ii) a short-range wireless mesh network protocol.

11. The apparatus according to claim 10, wherein said two or more of said apparatus are (i) connected to a common light switch and (ii) synchronized to be controlled together.

12. The apparatus according to claim 10, wherein said two or more of said apparatus are (i) connected to a different light switch and (ii) configured to be controlled based on a simulated user pattern.

13. The apparatus according to claim 10, wherein said two or more of said apparatus are (i) pre-selected by a user and (ii) configured to be controlled together based on said parameter.

14. The apparatus according to claim 1, wherein (i) said apparatus is further configured to perform a security measure based on said parameter and (ii) said security measure is at least one of (a) activating an outdoor alarm, (b) activating an indoor alarm, (c) contacting a trusted person and (d) contacting a central monitoring service.

15. The apparatus according to claim 1, wherein said apparatus is further configured to store external identifiers for recognizing external devices.

16. The apparatus according to claim 1, wherein said apparatus is implemented as part of at least one of (a) a light bulb and (b) a light fixture.

17. The apparatus according to claim 1, wherein said range of preset times is further based on an offset value from at least one of (a) dawn in a first mode and (b) dusk in a second mode.

18. The apparatus according to claim 17, wherein said values comprise said offset value based on at least one of (a) a number of minutes and (b) a zenith angle.

19. A method for controlling lights, comprising the steps of:

configuring a master light to connect to a device based on a wireless communications protocol;

configuring a plurality of child lights to connect to said master light;

determining a location of said master light;

synchronizing said master light to a universal clock;

receiving values from said device;

determining a local time based on (a) said universal clock and (b) said location, both defined by said values received from said device connected to said master light;

calculating a parameter based on (a) a selected time and (b) a range of preset times both defined by said values received from said device;

determining whether said local time matches said parameter; and if said local time matches said parameter, using said master light to control said plurality of child lights.

20. The apparatus according to claim 1, wherein said communication circuit is further configured to connect to said device through a network based on said communications protocol.

* * * * *